United States Patent [19]

Dowd

[11] Patent Number: 5,071,227
[45] Date of Patent: Dec. 10, 1991

[54] OPTICAL FILTER IN THE FORM OF A RECTANGULAR PARALLELEPIPED HAVING A PLURALITY OF NONINTERSECTING BEVELS

[75] Inventor: David A. Dowd, Somerville, Mass.

[73] Assignee: Luminati Ltd., Inc., Winchester, Mass.

[21] Appl. No.: 625,316

[22] Filed: Dec. 7, 1990

[51] Int. Cl.$^5$ .......................... G02B 5/22; G02B 1/04
[52] U.S. Cl. .................................... 359/885; 359/890
[58] Field of Search ................. 350/311, 315, 316, 318

[56] References Cited

U.S. PATENT DOCUMENTS

| 4,684,231 | 8/1987 | Athy | 350/318 |
| 4,740,059 | 4/1988 | Boldt | 350/317 |
| 4,865,424 | 9/1989 | Zupanick et al. | 350/318 |
| 4,974,937 | 12/1990 | Haigo et al. | 350/318 |

Primary Examiner—Jon W. Henry
Attorney, Agent, or Firm—Cesari and McKenna

[57] ABSTRACT

An optical filter is formed as a rectangular parallelepiped having a plurality of beveled edges formed thereon. preferably three non-intersecting beveled edges formed at an angle of 45 degrees. The filter is formed of a clear, transparent, durable, shock-resistant material, preferably abrasion-resistant Lucite TM acrylic resin (trademark of the Du Pont Corporation) impregnated with a subtractive dye. The material has a refractive index closely matching that of glass, but is tougher and more shock resistant. The filter dimensions are in the ratio of small whole integers, specifically 2:3:4, for example, 1×1.5×2 inches. The beveled edges increase the residence time of light within the filter. By positioning differently colored filters of different orientations in optical series, many different hues may be produced.

11 Claims, 1 Drawing Sheet

OPTICAL FILTER IN THE FORM OF A RECTANGULAR PARALLELEPIPED HAVING A PLURALITY OF NONINTERSECTING BEVELS

I. BACKGROUND OF THE INVENTION

A. Field of the Invention

The invention relates to optical filters and comprises an optical filter for demonstrating subtractive properties of light.

B. Prior Art

Despite the greatly expanded accessibility of higher education to the public at large, there is an alarmingly increasing ignorance among the public at large with respect to many basic matters of science and technology. Among the fields in which basic understanding is commonly lacking is the field of light, particularly the interaction of light of different colors.

A number of devices are known for demonstrating various properties of light, such as reflection, refraction, and dispersion, among others. Examples of such devices which are intended for common use are simple triangular prisms. Such devices, while simple and thus relatively inexpensive, are of limited appeal after initial use because there is limited or no interaction with each other.

Other devices which are more sophisticated, and thus potentially capable of providing the user with meaningful learning opportunities, are significantly more expensive. Additionally, they are frequently more complicated to use, and thus of limited utility in reaching the general public. More commonly, they appeal only to the smaller segment of the public having a strong interest in science.

Fewer devices are available for teaching the public about the basic interactive properties of light of different colors. Textbook illustrations fail to provide the active, "hands-on" experience that is desirable in learning in the area of science, and many of the physical aids are either too simple and too limited to be of significant value or are too expensive and complex to appeal to more than a limited group. For example, among the simple devices are filters of materials such as cellophane, colored to transmit light of selected colors, to thereby illustrated the subtractive properties of light. Such filters are typically flimsy, easily damaged, and, while inexpensive, not suitable for young children because of their fragility.

II. DESCRIPTION OF THE INVENTION

A. Objects of the Invention

Accordingly, it is an object of the present invention to provide an improved device for teaching certain properties of light.

It is a further object of the invention to provide a simple, durable device for teaching certain properties of light.

I is yet another object of the invention to provide a simple, durable device for teaching certain properties of light and which is of interest to young and old alike.

B. Brief Summary of the Invention

In accordance with the present invention, an optical filter is formed in the shape of a rectangular parallel piped having a plurality of beveled edges formed thereon, preferably three non-intersecting beveled edges formed at an angle of 45 degrees. The filter is formed of a clear, transparent, durable, shock-resistant material, preferably abrasion-resistant Lucite ™ acrylic resin (trademark of the du Pont Corporation) impregnated with a subtractive dye. The material has a refractive index closely matching that of glass, but is significantly tougher and more shock resistant.

The filter dimensions are in the ratio of small whole integers, specifically, 2:3:4. This enables the formation of a series of optical paths of regularly increasing lengths, and thus of regularly changing hues, when several filters of different color are combined with each other. Further, the successive path lengths are thereby gradated in accordance with the f-stop settings of conventional cameras, which correspond to the minimum detectable color differences commonly perceptible by humans. In the preferred embodiment of the invention, the filters have dimensions of $1 \times 1.5 \times 2$ inches. This provides a filter which is comfortable to hold in one's hand, whether adult or child, and yet too large for a child to swallow. Another unique consequence of this design is that these dimensional ratios produce sound intervals that include an octave tone as well as a fifth when selected faces of the filters are clapped together as children are wont to do. The result has been found pleasing to children and adults alike.

The beveled edges increase the residence time within the filter of light incident on the filter. This feature allows the use of a smaller amount of colorant to obtain the desired hue than would otherwise be the case, and thus increases the brilliance an purity of the hue of the resultant filter. Additionally, the use of a dye colorant, instead of a pigment colorant, further enhances the brilliance and purity of the filter.

The resultant filter serves both an ideal device for dramatically illustrating the subtractive properties of light and as an object of beauty in its own right. Thus, both children and adults find it an intriguing device not only for its precise optical properties, but also simply for its beauty. Preferably, a plurality of filters are used in combination, each impregnated with a separate one of the subtractive colors cyan, magenta, yellow. When used two at a time or even three at a time, an extraordinarily wide range of colors and intensities are provided. Thus, as is well known, white light transmitted through cyan and magenta filters becomes blue, that is, its red and green components are subtracted. In the filters of the present invention not only is this effect vividly demonstrated by abutting cyan and magenta filters against each other and transmitting otherwise unfiltered light through them, but the saturation of the transmitted color is readily changed by placing different faces of the filters together so as to vary the path length of the transmitted light. Thus, with two filters of the present invention, nine different path lengths, and thus nine different levels of saturation, are obtained. Accordingly, the observer obtains a vivid demonstration of the optical characteristics of light, and the significance of different saturation levels of the same hue, in a manner not provided by other simple devices.

In addition to the characteristics provided by the geometry of the filters of the present invention, the spectral purity of the colors is enhanced by the use of dyes instead of pigments, the latter often being used as colorants in many devices commonly available. In particular, I have found a unique set of dyes that are relatively inert to the Lucite material preferably used to form the filters and which provide a spectral purity of such high degree as to enable the filters of the present invention to be used as calibration standards for applications such as high-quality color printing, video monitor calibration, and the like.

Specifically, I have found that brilliant filter colors are provided by the following dyes in concentrations of the order of those set forth below:

| Color | Dye | Manufacturer | Concentration |
|---|---|---|---|
| Cyan | Orasol Blue GN | Ciba-Geigy | 0.00124% |
| Magenta | Macrolex Violet 3R | Mobay | 0.00149% |
| Yellow | Orasol Yellow 2GLN | Ciba-Geigy | 0.00100% |
| | Orasol Yellow 2RLN | Ciba-Geigy | 0.00035% | where the concentration is given in percentage by weight of dye with respect to weight of the Lucite body material. When used in the filters of the present invention, the dyes above produce a unique blue (cyan and magenta filters) and a unique red (magenta and yellow filters), that is, a blue and a red that are nearly universally perceived as the ideal blue and red. Indeed, and surprisingly, spectrally pure blue and red are obtained by combining the above subtractive primary colors as follows:

| Color | Dye | Manufacturer | Concentration |
|---|---|---|---|
| Red | Macrolex Violet 3R | Mobay | 0.00059% |
| | Orasol Yellow 2GLN | Ciba-Geigy | 0.00040% |
| | Orasol Yellow 2RLN | Ciba-Geigy | 0.00014% |
| | Orasol Red B | Ciba-Geigy | 0.00008% |
| Green | Orasol Yellow 2GLN | Ciba-Geigy | 0.00051% |
| | Orasol Yellow 2RLN | Ciba-Geigy | 0.00017% |
| | Orasol Blue GN | Ciba-Geigy | 0.00062% |
| Blue | Macrolex Violet 3R | Mobay | 0.00074% |
| | Orasol Blue GN | Ciba-Geigy | 0.00062% |

The above concentrations have been found to be the optimum for use in forming the filters of the present invention by casting. Changes on the order of approximately 10% or more in these concentrations have been found to produce changes in hue that are noticeable to observers, while changes on the order of 20% or more generally produce marked departures from the spectrally correct hues. Accordingly, the above concentrations are desirably utilized to within a few percent, although some variation may necessarily be made to accomodate the particular details of the casting process, such as casting temperature, accelerators, and other such particulars.

C. Detailed Description of the Invention

The above and other and further objects and features of the invention will be more readily understood on reference to the following detailed description of the invention when taken in conjunction with the accompanying drawings, in which.

Figure 1:
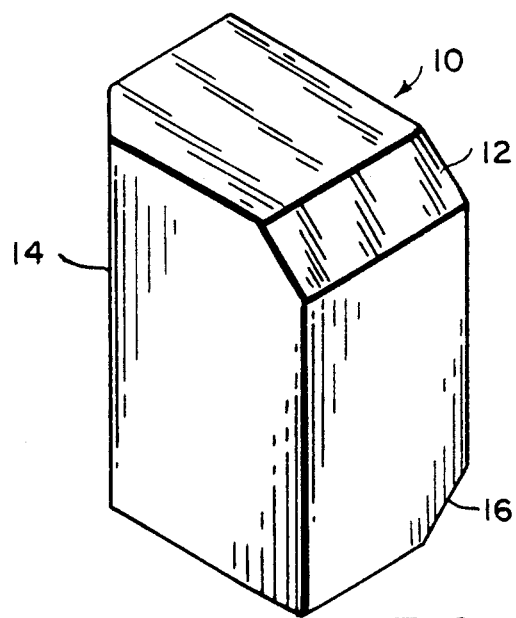
FIG. 1 is a view in perspective of a filter in accordance with the present invention.
Figure 2:
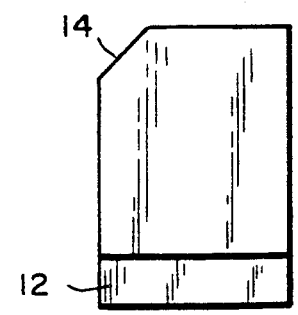
FIG. 2 is a top plan view of the filter of FIG. 1.
Figure 4:
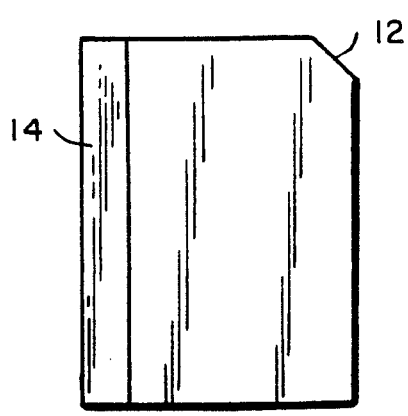
FIG. 4 is a left side elevational view of the filter of FIG. 1.
Figure 3:
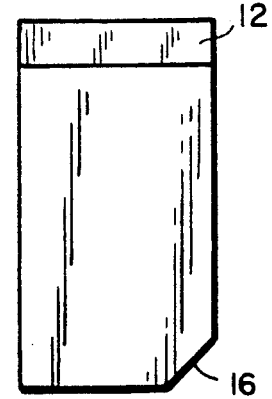
FIG. 3 is a vertical front view of the filter of FIG. 1.
Figure 5:
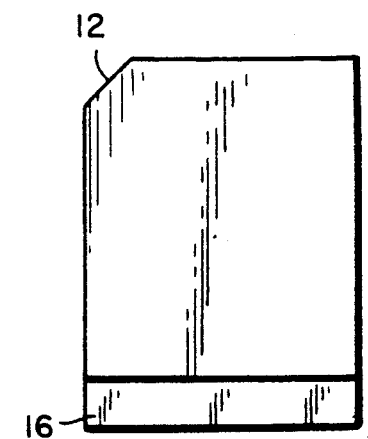
FIG. 5 is a right side elevational view of the filter of FIG. 1.
Figure 6:
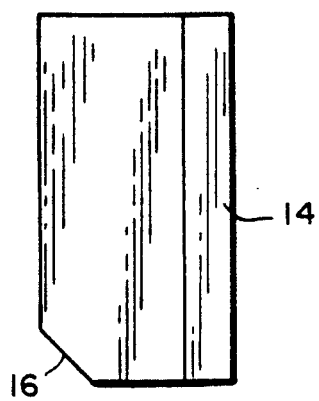
FIG. 6 is a rear elevational view of the filter of FIG. 1.
Figure 7:
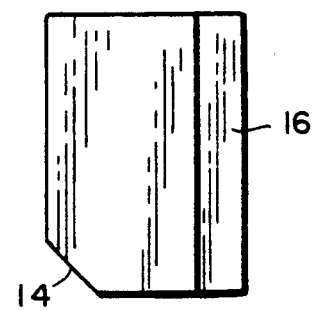
FIG. 7 is a bottom plan view of the filter of FIG. 1.

The optical filter 10 of the present invention comprises a rectangular parallelepiped having non-intersecting bevels 12, 14, 16 on the front, side, and bottom faces, respectively. As will be observed from the drawings, regardless of which face is presented to the viewer, one of the three beveled edges is presented to the viewer in full plan, while another is presented in profile; the third is obscured. The beveled edges are formed at 45 degrees to the plane of two of the faces they intersect, and at ninety degrees to the transverse intersected faces. They significantly increase the time that light incident on the filter resides in the filter, and thus enhance the spectral purity of the filter.

In particular, the preferred material for the filter of the present invention is "Lucite," a tough, durable, relatively shock-resistant and abrasion-resistant acrylic resin having a refractive index approximating that of glass, that is, on the order of 1.5. With this material, total internal reflection occurs at an angle of incidence of approximately 42 degrees and this, in combination with the rectangular geometry and relative dimensions of the faces, ensures that light incident on the faces of the filter must make a large number of passes through the filter before it emerges. This enhances the interaction between the light and the dye colorant of the filter, enables the use of a smaller amount of colorant than would otherwise be necessary to obtain a given hue, and provides a spectral hue of extraordinary purity that is unusually attractive to both children and adults alike.

I claim:

1. An optical filter comprising an optically transparent material in the form of a rectangular parallelapiped having a plurality of non-intersecting bevels formed on edges thereof.

2. An optical filter according to claim 1 including three non-intersecting bevels formed thereon.

3. An optical filter according to claim 1 in which said bevels are formed at an angle of approximately 45 degrees to the plane of intersecting faces.

4. An optical filter according to claim 2 in which said bevels are formed at an angle of approximately 45 degrees to the plane of intersecting faces.

5. An optical filter according to claim 1 in which said filter is formed of a material having a refractive index approximating that of glass.

6. An optical filter according to claim 5 in which said filter is formed of an acrylic resin.

7. An optical filter according to claim 6 in which said filter is formed of "Lucite."

8. An optical filter according to claim 1 in which the dimensions of said filter have the ratio of small whole numbers.

9. An optical filter according to claim 8 in which the dimensions of said filter are in the ratio of 2:3:4.

10. An optical filter according to claim 1 in which said filter is impregnated with dye.

11. An optical filter according to claim 10 in which said dye is chosen from the group consisting of Orasol Blue GN, Macrolex Violet 3R, Orasol Yellow 2GLN, and Orasol Yellow 2RLN.

* * * * *